US007239992B2

(12) United States Patent
Ayache et al.

(10) Patent No.: US 7,239,992 B2
(45) Date of Patent: Jul. 3, 2007

(54) APPARATUS FOR SIMULATING THE DEFORMATION OF MATERIALS, NOTABLY OF SOFT BODY TISSUES

(75) Inventors: Nicholas Ayache, Nice (FR); Herve Delingette, Antibes (FR); Guillaume Picinbono, Nice (FR)

(73) Assignee: INRIA Institut National de Recherche en Informatique et en Automatique, Le Chesnay Cedex (FR)

( * ) Notice: Subject to any disclaimer, the term of this patent is extended or adjusted under 35 U.S.C. 154(b) by 817 days.

(21) Appl. No.: 10/061,455

(22) Filed: Feb. 4, 2002

(65) Prior Publication Data

US 2002/0183992 A1  Dec. 5, 2002

(30) Foreign Application Priority Data

Feb. 8, 2001 (FR) ................... 01 01717

(51) Int. Cl.
- G06G 7/48 (2006.01)
- G06F 3/00 (2006.01)
- G06T 15/00 (2006.01)
- G06T 17/00 (2006.01)
- G09G 5/00 (2006.01)
- A61H 1/00 (2006.01)

(52) U.S. Cl. .................. 703/11; 434/262; 434/295; 601/3; 715/701; 715/702

(58) Field of Classification Search ............... 703/2, 703/6, 7, 11; 434/262, 295; 600/410, 411; 601/3; 715/701–702, 757; 345/419, 424, 345/643–644, 664, 647

See application file for complete search history.

(56) References Cited

U.S. PATENT DOCUMENTS 5,588,032 A * 12/1996 Johnson et al. ................ 378/8

(Continued)

FOREIGN PATENT DOCUMENTS

FR  2 771 202  5/1999

(Continued)

OTHER PUBLICATIONS

Nikitin et al., Real-time Simulation of Eleastic Objects in Virtual Environments using Finite Element Method and Precomputed Green's Functions, ACM 2002.*

(Continued)

*Primary Examiner*—Anthony Knight
*Assistant Examiner*—Tom Steven
(74) *Attorney, Agent, or Firm*—Foley & Lardner LLP

(57) ABSTRACT

The invention relates to the simulation of the deformation of materials, notably of soft body tissues. An apparatus comprises a memory (MEM, NT) storing data as to the position of an object, recorded at the vertices of a grid pattern, and data for force to be exerted on the object. A computer (μP, MT) evaluates new positions of the vertices, as a function of a force exerted globally and mechanical parameters of the material. According to the invention, this computer comprises a module for calculating, for each mesh, a deviation between the current length of an edge and its previous length, and the force data at each vertex of the mesh. Another module calculates, for each vertex, new positional data relating to this vertex as a function of the forces exerted thereon and its previous position.

14 Claims, 3 Drawing Sheets

U.S. PATENT DOCUMENTS

| | | | | |
|---|---|---|---|---|
| 5,594,651 | A * | 1/1997 | St. Ville | 700/98 |
| 5,715,412 | A * | 2/1998 | Aritsuka et al. | 715/729 |
| 5,754,182 | A * | 5/1998 | Kobayashi | 345/423 |
| 6,516,211 | B1 * | 2/2003 | Acker et al. | 600/411 |
| 6,636,234 | B2 * | 10/2003 | Endo et al. | 345/646 |
| 6,714,901 | B1 * | 3/2004 | Cotin et al. | 703/7 |
| 2002/0016700 | A1 * | 2/2002 | Furusu et al. | 703/6 |
| 2002/0042703 | A1 * | 4/2002 | Furusu et al. | 703/11 |
| 2003/0108853 | A1 * | 6/2003 | Chosack et al. | 434/262 |

FOREIGN PATENT DOCUMENTS

| | | | | |
|---|---|---|---|---|
| WO | WO 99/26119 A1 * | 5/1999 | | 703/7 |

OTHER PUBLICATIONS

Picinbono et al., Non-Linear Anisotropic Elasticity for Real-Time Surgery Simulation, INRIA Research Report 4028, Oct. 2000. Reprinted 2001 IEEE.*

James et al., ArtDefo Accurate Real Time Deformable Objects, ACM 1999.*

Debunne et al., Dynamic Real-Time Deformations using Space and Time Adaptive Sampling, ACM Aug. 12-17, 2001.*

Cotin et al., Real-time Elastic Deformations of Soft Tissues for Surgery Simulation, IEEE 1999.*

Picinbono et al., Anisotropic Elasticity and Force Extrapolation to Improve Realism of Surgery Simulation, IEEE 2000.*

Picinbono et al., Non-Linear and Anistropic Elastic Sotf Tissue Models for Medical Simulation, IEEE May 2001.*

Delingette, Toward Realistic Soft-Tissue Modeling in Medical Simualtion, IEEE 1998.*

Delingette et al., A Hybrid Elastic Model allowing Real-time Curring, Deformation and Force-Feedback for Surgery Training and Simulation, INRIA report 2000.*

Delingette "Toward Realistic Soft-Tissue Modeling in Medical Simulation" (1997) IEEE p. 512-523.*

Debunne et al., "Interactive Multiresolution Animation of Deformable Models" 1999 Eurographics Workshop p. 1-7.*

Montagnat et al., "Volumetric Medical Images Segmentation using Shape Constrained Deformable Models" 1997. p. 1-10.*

* cited by examiner

APPARATUS FOR SIMULATING THE DEFORMATION OF MATERIALS, NOTABLY OF SOFT BODY TISSUES

CROSS-REFERENCE TO RELATED PATENT APPLICATIONS

This application claims priority to French Patent Application 0101717, filed Feb. 8, 2001 including the specification, drawings, claims and abstract, incorporated herein by reference in its entirety.

BACKGROUND OF THE INVENTION

The following description of the background of the invention is provided simply as an aid in understanding the invention and is not admitted to describe or constitute prior art to the invention.

The invention relates to the simulation of deformation of materials, notably of soft body tissues.

Usually, a display interface is provided for representing at least one object following a predetermined shape, displayed with a selected grid pattern. A user interface provided with mechanical handling means allows the user to simulate one or more forces exerted globally on the object.

A memory is also provided for storing mechanical parameters of the material of which the object in question consists, data as to the position of the object, recorded at the vertices of a selected mesh, and force data which represent, in intensity and position, stress to be exerted on the object.

A computer operatively connected to the memory evaluates new positions of the vertices, as a function of the stress exerted and the mechanical parameters of the material. In order to display the deformation and/or the return to a resting position of the moving object, the computer calculates the evolution of the positions of the vertices over time as a function of this stress. When it is used to simulate the deformation (or cutting) of body tissues, a qualified person (such as a surgeon) is able to follow the simulation of a deformation and/or a return to a resting position.

In the published application no. FR-9714506 by this Applicant, the simulation of the deformations of the object was based on a linear model, in the embodiment described. Although the use of the apparatus described in FR-9714506 has proved very promising in the field of surgical assistance for simulating the cutting of soft body tissues (liver, skin, etc), the simulation of large movements, possibly non-linear, was not completely natural. Moreover, this apparatus could not predict the reaction to a force exerted on just any type of deformable material, particularly in the case of large movements.

Thus, simulated deformations with large shifts in position are not normally reliable. The present invention sets out to improve the situation.

SUMMARY OF THE INVENTION

According to one embodiment of the invention, the computer comprises a module capable of repeatedly determining, for each mesh element, the deviation between the current length of a side of the mesh and its resting length, and of storing the respective force data for each vertex of the mesh, and a module capable of repeatedly determining, for each vertex, new positional data relating to this vertex as a function of the composition of the forces exerted thereon, data relating to at least one earlier position of the vertex and mechanical parameters of the material.

According to one embodiment of the invention, the mesh pattern chosen comprises at least one triangular base.

Thus, if the object is in the form of a hollow three-dimensional envelope, the mesh pattern chosen is preferably triangular, so that the computer is capable of determining the composition of the forces at each vertex of a triangle, as a function of the deviation between the current length of each side of the triangle and the length of this side at rest.

If the object has a solid three-dimensional shape, the mesh pattern chosen is preferably tetrahedral, so that the computer can determine the composition of the forces at each vertex of the tetrahedron, as a function of the deviation between the current length of each edge of the tetrahedron and the length of this edge at rest.

Advantageously, the memory is arranged so as to store, in conjunction with each mesh element, mechanical parameters of the material of the mesh, at least partly defined locally, particularly at the level of the mesh or elements thereof.

According to another embodiment of the present invention, the computer is designed to determine said deviation between current length and resting length, in order to estimate a derivative of the potential energy of deformation of each mesh, expressed as a function of a Green-St Venant tensor and mechanical coefficients inherent in the material in this mesh.

The derivative of the potential energy thus expressed in relation to the position of the vertex makes it possible to obtain the force (or composition of forces) exerted thereon.

In estimating the derivatives of the potential energy at the vertices, thus expressed as a function of a Green-St Venant tensor, the computer is adapted to determine more precisely the differences between the squares of the current lengths and resting lengths of each side, in order to determine the composition of the forces mentioned above.

The mechanical parameters mentioned above advantageously comprise the Lamé coefficients of the material in each mesh in question.

The apparatus according to one embodiment of the invention, can thus be used to simulate large movements and/or non-linear elasticity, possibly of heterogeneous objects, formed of different materials.

It is thus possible to simulate the deformation of a solid three-dimensional object, possibly enveloped in a hollow skin. In this case it will be advisable to apply a tetrahedral grid to the object and a triangular grid to the skin and to apply suitable mechanical parameters to each type of mesh. It is also possible to simulate the movements of soft objects (such as muscles) in the presence of rigid integrated objects (such as bones), as will be seen hereinafter.

The present invention may also take the form of a process for simulating the deformation of objects, particularly of soft body tissues, comprising all or some of the following steps of (a) specifying a predetermined form for the object at rest, (b) making a grid image of said form, based on a selected pattern, preferably with a triangular base (triangle or tetrahedron), (c) storing the positional data for the vertices of the mesh in the object at rest, (d) simulating one or more forces exerted globally on the object (or the movements of the object), (e) estimating, as a function of the mechanical properties of the material and the positions of the preceding vertices, a resultant force on each vertex of each mesh, and (f) as a function of the force exerted on each vertex, determining the movement and, hence, the deformation and/or the return to a position of equilibrium of the vertices of the meshes.

Step (c) also involves attributing indices to the elements of the meshes, within the scope of establishing a data structure, and, if appropriate, simplifying the structure of the object, as will be seen hereinafter. Steps (e) and (f) are based on a model developed by the Applicant which will be described in detail hereinafter.

It is to be understood that both the foregoing general description and the following detailed description are exemplary and explanatory only, and are not restrictive of the invention as claimed.

BRIEF DESCRIPTION OF THE DRAWINGS

Further features and advantages of the invention will become apparent from studying the detailed description that follows and the accompanying drawings described below.

DETAILED DESCRIPTION

The present description will refer to formulae and equations which appear in the annex.

The drawings, and the annex, essentially contain elements of a definite nature. They can therefore not only be used to gain a fuller understanding of the description, but may also contribute to the definition of the invention, where appropriate.

Figure 1:
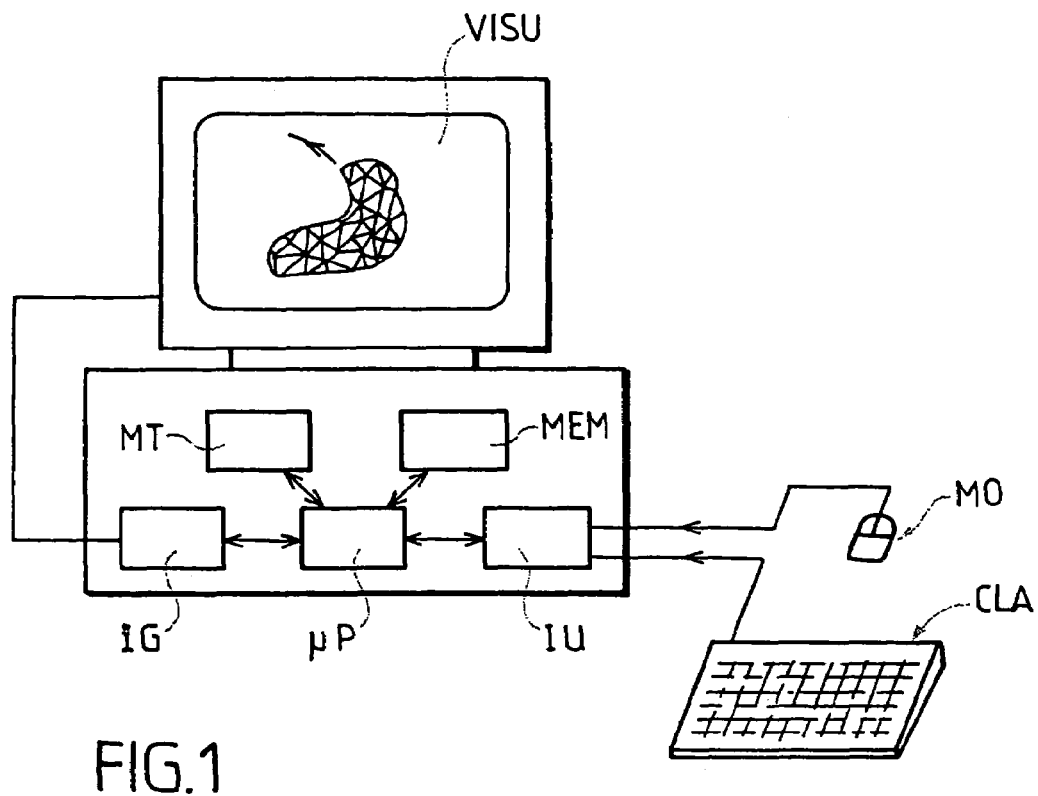
FIG. 1 diagrammatically shows an apparatus according to one embodiment of the invention.

Reference is made first of all to FIG. 1 in which the apparatus is shown in the embodiment described in the form of a computer (PC). The computer comprises a permanent memory MEM (for example of the ROM type) in which are stored programs for calculating the positions of the mesh vertices and the resultant forces at these vertices, as well as a processor µP operatively connected to a working memory MT (for example of the RAM type) for carrying out these calculations.

The abovementioned modules of the computer described hereinbefore may, if necessary, be in the form of programs stored in the memory MEM, or may be loaded into the working memory MT, from reading a data carrier in an external peripheral (not shown) such as a disc drive or a CD-ROM reader, or received via a communications link, e.g. a MODEM. Of course, such programs appear to be particularly important means for carrying out the invention. Thus, the present invention also relates to programs of this kind, possibly on a data carrier of the type mentioned above (disc, CD-ROM, etc), detailed embodiments of which are described hereinafter.

The computer further comprises a monitor VISU connected to the processor µP via a graphic interface IG, the unit consisting of VISU and IG (referred to as the "display interface" hereinbefore) providing a display of an object the deformation of which is being simulated. The computer further comprises a user interface IU connected to mechanical handling means such as a keyboard CLA or a mouse MO, enabling a user to simulate a force exerted globally on the object, or a change of position of this object, with initial deformation.

Figures 2A, 2B:
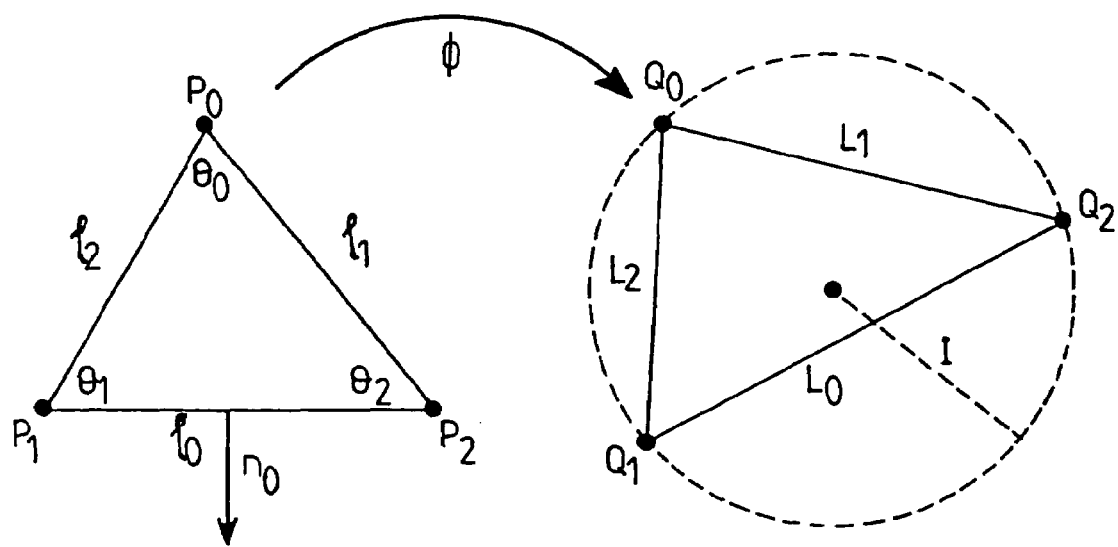
FIGS. 2A and 2B diagrammatically show triangular meshes, in the initial and deformed state, respectively, with notations for the points of the triangle subsequently used in estimating the composition of the forces at each vertex of the triangle.

The shape of the object to be displayed in grid form may be a surface shown in three dimensions. In this case, the mesh is triangular (FIG. 2A). The shape of the object to be displayed in grid form may be a three-dimensional solid and in this case the mesh is tetrahedral (FIG. 2B). If appropriate, a grid module is stored in the memory MEM and can be implemented by the processor µP, co-operating with the graphic interface IG, to display a shape of the grid-covered object on the monitor VISU.

The following is a description of a model, for example purposes only, developed by the Applicant and applied to an apparatus for simulating deformation. This model uses a resting form without mathematical induction in relation to a resting position (mathematical induction by shifts which is normally the basis of conventional models).

Let us consider first of all a surface shown in three dimensions, gridded with a triangular mesh pattern. A triangle T0=(P0, P1, P2) of the resting form, with edges ($l_0$, $l_1$, $l_2$). This triangle (on the left in FIG. 2A) undergoes a transformation Φ to give the triangle T=(Q0, Q1, Q2) (on the right in FIG. 2B).

The potential elastic energy of this deformation is expressed here from the Cauchy-Green C deformation tensor (formula F1 of the Annex). Looking at the finished element obtained by associating a set of linear interpolation functions with this triangle, the deformation gradient is expressed at every point X on the triangle by the formula F2, wherein A is the area of the triangle T0, nj is the unit vector perpendicular to the segment (Pj+1, Pj+2), and the $\alpha_j$'s are shape vectors of the triangle.

The deformation tensor C is then given by the expression of formula F3. Advantageously, this deformation tensor is invariant by translation and therefore does not depend on the choice of the origin of the reference point. Preferably, the origin of the reference point is placed in the centre of the circle circumscribed around the deformed triangle T, of radius r (FIG. 2A), which allows the tensor C to be expressed in the form given in formula F4, where Lp is the length of the deformed edge joining the vertices Qj and Qk.

The expression of the potential deformation energy (given by formula F5 in the annex) uses those of the trace of the tensor C (given by formula F6) and of the trace of the tensor C2 (which will be described hereinafter).

Starting from the classic equations in the triangle T0 (cosine rule), which are expressed by the formula F7, the scalar products between the directing vectors are obtained, given by equation R1 in the annex. The respective traces of the tensors C and E are thus written according to formulae 8 and 9 in the annex. This term depends only on the variations in length of the edges of the triangle and its resting shape (represented by the magnitudes Ki).

From the expression of tr $C^2$ (formula F1O), $trE^2$ is deduced and, finally, the potential elastic energy of deformation of the triangle is given by equation R2 in the annex.

The elastic force applied by the triangle at one of its vertices is obtained by deriving the elastic energy relative to the position of this vertex. In the embodiment shown in FIG. 2A, the vertex P0 has QO for its deformed position. Deriving the equation R2 in relation to QO, the first step is preferably to derive the terms $L^2p$ in order to obtain the expression of the force according to formula F11, which is the equation of the elastic force exerted by the triangle at each of its vertices. This force is expressed solely as a function of the variations in length of the sides of the triangle ($Li^2$-$li^2$), the mechanical parameters of the material ($\lambda$ and $\mu$) and the shape of the triangle at rest (given by the terms Ki).

Advantageously, this force implicitly contains a property of rotationally invariance as all its terms remain zero as long as the lengths of the sides of the triangle do not change, i.e. as long as the triangle is not deformed. Thus, the calculations of movements can be simplified by virtue of the fact that it is no longer necessary to compensate for rigid transformations, as invariance by rigid transformation is intrinsic to the formulation of the deformable model.

Figures 3A, 3B, 3C, 3D:
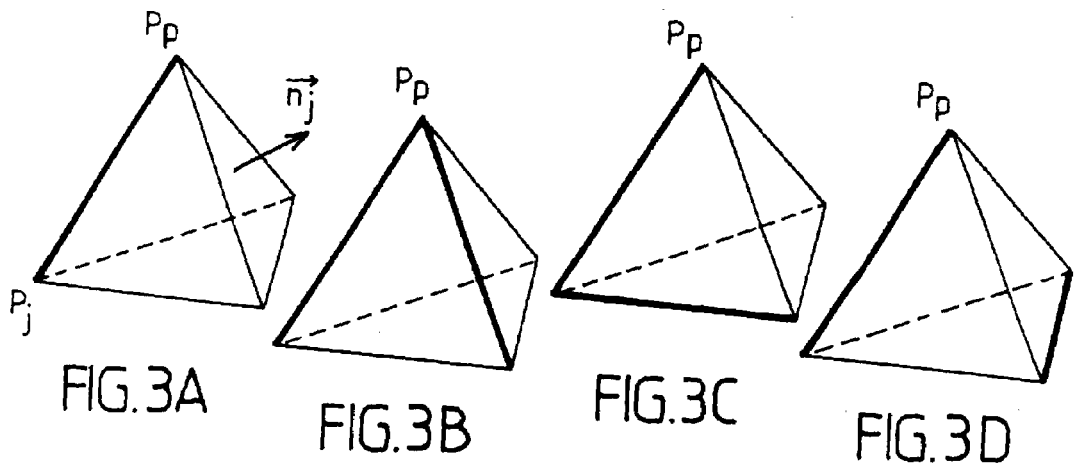
FIG. 3A is a diagram of a tetrahedron which helps in the understanding of the notations used for a point Pj of the tetrahedron and the normal vector nj of the opposite face.
FIGS. 3B to 3D are diagrams of tetrahedrons which, together with the abovementioned FIG. 3A, help to show how the sums on the edges and pairs of edges of a tetrahedron are calculated, in order to evaluate a force to which a vertex Pp of the tetrahedron is subjected.

Extending the foregoing to a solid three-dimensional shape (having a volume), gridded with a mesh of tetrahedrons, by formulating the elasticity according to Saint Venant-Kirchhoff it is possible to express the gradient of deformation (formula F12), as well as the Cauchy-Green deformation tensor (formula F13), where Aj is the area of the face opposite the vertex Pj, nj is the perpendicular to this face and V is the volume of the tetrahedron (FIG. 3A).

By placing the centre of the reference point at the centre of the sphere circumscribed around the tetrahedron T, it is possible to express the scalar product of the position vectors of two vertices of the tetrahedron as a function of the length of the edge that joins them and the radius r of the sphere, thus making it possible to write the deformation tensor according to formula F14.

The elastic deformation energy is expressed as a function of the Green-Saint Venant deformation tensor (bearing the reference E), but in a 3D grid (formula F15). The expression of the trace of the tensor C is also expressed with the scalar products ($\alpha j.\alpha k$), using the cosine rule for dihedral angles and as a function of the lengths of the edges of the tetrahedron (formulae 16 and 17). Consequently, the trace of $C^2$ is written according to formula P18. Finally, the Applicant has shown that the elastic deformation energy is expressed by the formula F19 of the annex (complemented by the formula F2O).

The expression of the elastic force exerted by the tetrahedron on one of its vertices is obtained by deriving the elastic energy relative to the position of this vertex. A formulation which is easy to use is expressed by formula F21 of the annexe and is interpreted using FIGS. 3A to 3D.

In formula F21 in the second line, k and m are the complementary indices of j and p, in the last line, m is the complementary index of j, k and p, and: $K_{jkmp}=K_{jp}K_{km}+K_{jm}K_{kp}-K_{jk}K_{mp}$ The total on the edges (j,p) indicates that it is necessary to travel over the three edges adjacent to the vertex Pp (on which the force is exerted) whereas the total on the edges (j,k) (indices different from p) involves the three edges located on the face opposite the vertex Pp.

Referring to FIGS. 3A to 3D:

the total on the edges (j,p) involves three terms (FIG. 3A), the total on the pairs of edges ((j,p), (k,p)) involves three terms (FIG. 3B), the total on the pairs of edges ((j,p), (j,k)) involves six terms (FIG. 3C) and the total on the pairs of edges ((j,k), (m,p)) involves three terms (FIG. 3D).

Once again, there is rotational invariance of the above expressions, for a solid three-dimensional form, which advantageously makes it possible to avoid the appearance of unrealistic distortions when part of the object is rotated too far. This invariance also extends to movements of translation. Thus, the object may undergo any overall movement of translation and rotation while retaining zero internal energy and stresses. The Applicant has verified that in this case the rigid component of the deformation is zero.

Moreover, the discretization of the object using finished elements comes to approximate the elastic energy over a set of sub-domains defined by simple geometric shapes. The above model thus suggests, for each sub-domain, a formulation of the energy which only depends on the change in shape of this domain.

Advantageously, displaying a simulated deformation while considering an initial resting shape (rather than initial resting positions) appears to be more natural than the deformations simulated with known models. Moreover, considering an initial resting shape avoids the problems of accuracy that arise when the model moves substantially away from its resting position.

The following is a description of the preliminaries to using the abovementioned computer modules to determine the forces at each vertex of the chosen mesh.

First of all, a data structure should be defined. The Applicant has first dealt with the difficulty of attributing suitable indices to the elements of each mesh.

For triangular patterns, the data structure corresponding to triangulation consists of a list of triangles, a list of sides and a list of vertices:

for each vertex, an adjacent side is determined, for each side, a pointer is determined on the two adjacent triangles, and the two vertices which form the side are determined, for each triangle, the pointers are determined on the three vertices that form the triangle, the three sides of the triangle are determined, the three triangles adjacent to each side are determined, and three values giving the index of adjacency of the current triangle for each adjacent triangle are determined.

The orientation of the three vertices in the triangle is carried out as follows.

Figures 4A, 4B:
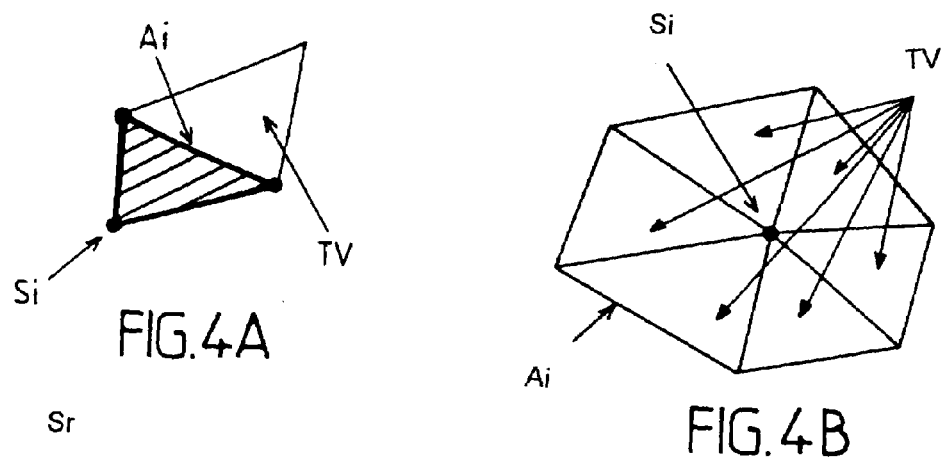
FIGS. 4A and 4B are diagrams to assist in the understanding of the attribution of indices in different triangular meshes.

For the grid as a whole to be correctly oriented, each edge or side must be traveled over in two different directions when each of its two adjacent triangles is traveled over. Referring to FIG. 4A, the side Ai of index i is the side opposite the vertex Si of index i in this triangle. The adjacent triangle to index i is the neighboring triangle TV, adjacent to the side Ai. Finally, each triangle always has three adjacent triangles. In order to represent surfaces with borders (a plane has one border, a cylinder has two borders) the notion of so-called "virtual" vertices and triangles is used (FIG. 4B). The virtual triangles are not displayed and the position of the virtual vertex is of no consequence to the geometry of the grid.

An example of index attribution will now be given by way of example, in C++ language.

If the adjacent triangle number i is called neighbor[i], then the adjacency index "whichNeighbor[i]" is defined by an instruction such as Neighbor[i]→neighbor[whichNeighbor[i]]=this;

For reasons connected with a tetrahedral grid, the data structure of a tetrahedral volume consists of a list of tetrahedrons, a list of triangles, a list of edges and a list of vertices.

For each vertex, its position and an adjacent tetrahedron are stored.

For each edge, the pointers on the two adjacent vertices and a pointer on a triangle adjacent to this edge are stored.

For each triangle, the pointers on the three vertices that form the triangle and the pointers on the two tetrahedrons adjacent to the triangle are stored.

For each tetrahedron:
the pointers on the four vertices that form the tetrahedron,
the pointers on the six edges of the tetrahedron,
the pointers on the four triangles of the tetrahedron, and
the pointers on the four adjacent tetrahedrons opposite each of the four vertices are stored.

Each tetrahedron is oriented. Starting from the orientation of the four vertices ABCD, the operator seeks to orient the four triangles: BCD, ADC, ABD, ACB. To ensure correct orientation of the grid, each triangle has to be traveled over in two different directions by traveling over each of its two adjacent tetrahedrons. Finally, each tetrahedron is always adjacent to four tetrahedrons. The notion of so-called "virtual" vertices and "virtual tetrahedrons" is introduced to take account of the borders of the grid.

In order to simplify the structure of the deformed object, the grid is cut up by removing material (more precisely a vertex Sr, although this vertex cannot be a virtual vertex).

Figures 5A, 5B, 6:
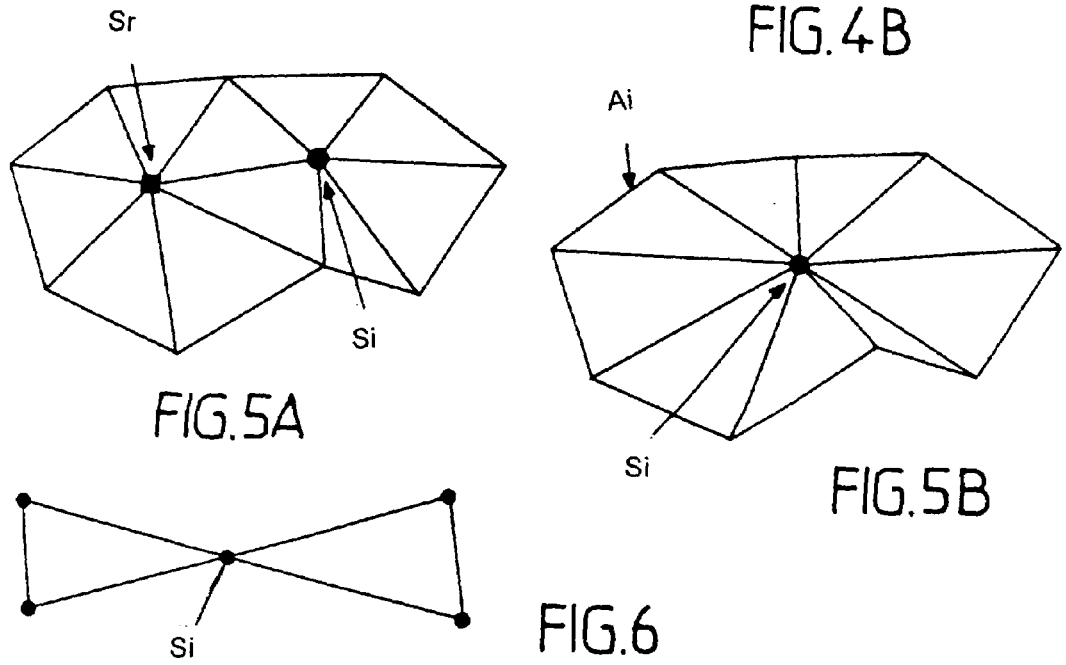
FIGS. 5A and 5B are diagrams of triangular motifs comprising, respectively, a current vertex (represented by a square) and a virtual vertex (represented by a disc), before simplification, and the same gridded shape after simplification.
FIG. 6 diagrammatically shows an example of a nonconforming triangular mesh.

In the case of a triangular mesh, if this vertex is not adjacent to a virtual vertex, this vertex is regarded as being virtual like all these adjacent triangles. If the vertex is already adjacent to a virtual vertex, the side which connects this point to the virtual vertex is removed, and all the triangles adjacent to the virtual vertex are forced to be virtual (FIGS. 5A and 5B).

With a tetrahedral grid pattern, the procedure involves removing a set of associated tetrahedrons. Once the tetrahedrons have been removed the grid must remain true, as described hereinafter. For this, it may be advantageous to remove more tetrahedrons than those present in the set of tetrahedrons mentioned at the beginning. Virtual vertices may also be added or removed when creating associated components or removing the borders.

The Applicant has confronted the problem of ensuring conformity of the grid, a definition of which is provided hereinafter.

For a triangular mesh to be true, each side must belong to more than two triangles and the topological neighborhood of each vertex must remain homeomorphous with a circle (or with a semicircle), i.e. if two triangles share the same vertex, there must be a set of triangles adjacent to each other which make it possible to go from one triangle to another. Referring to FIG. 6, the triangular mesh shown is not true, as the two triangles have an intersection along a vertex, while there are no adjacent triangles making it possible to go from one of these two triangles to the other.

For a tetrahedral grid to be true, each triangle must belong to more than two tetrahedrons and the topological neighborhood of each vertex must be homeomorphous with a sphere (or a hemisphere if it is on the border). Therefore, if two tetrahedrons share the same vertex, it is essential that there is a set of tetrahedrons adjacent to one another which make it possible to pass from one tetrahedron to another.

The equation that governs the movement of the linear elastic model is the Newtonian differential equation E1 in the annex. This equation is connected with the differential equations encountered in the mechanics of continuous media (equation E2).

According to the theory of the finished elements, the mass matrix M and the attenuation matrix C are hollow and depend on the properties of each tetrahedron. Moreover, these matrices M and C may be considered here as being diagonal, i.e. the mass and the effects of attenuation are concentrated on the vertices of the mesh. This simplification, known as mass-lumping, uncouples the movements of each of the nodes and thus makes it possible to write the previous equation E2 as a set of independent differential equations of the type E1, with an equation for each vertex.

The choice of an explicit integration diagram leads to the expression of the elastic forces at the time t, to calculate the new position of the vertex at the time t+1, with the equation E3 in the annex. Advantageously, this equation E3 applies to all types of force, both linear and otherwise.

The explicit diagrams are only conditionally stable and therefore converge less rapidly than the implicit diagrams.

Another difficulty arises: for the diagram to be stable, the time step used for the digital integration should be sufficiently short. The critical time step depends on the greatest intrinsic value of the rigidity matrix and of the local values of the mass and of the attenuation. To optimize the time step, the mass matrix is fixed to be equal to identity, and the optimization of the local values of attenuation, so as to limit the risks of oscillations, have the effect of improving the packaging of the linear system, and hence of establishing its resolution.

Figure 7:
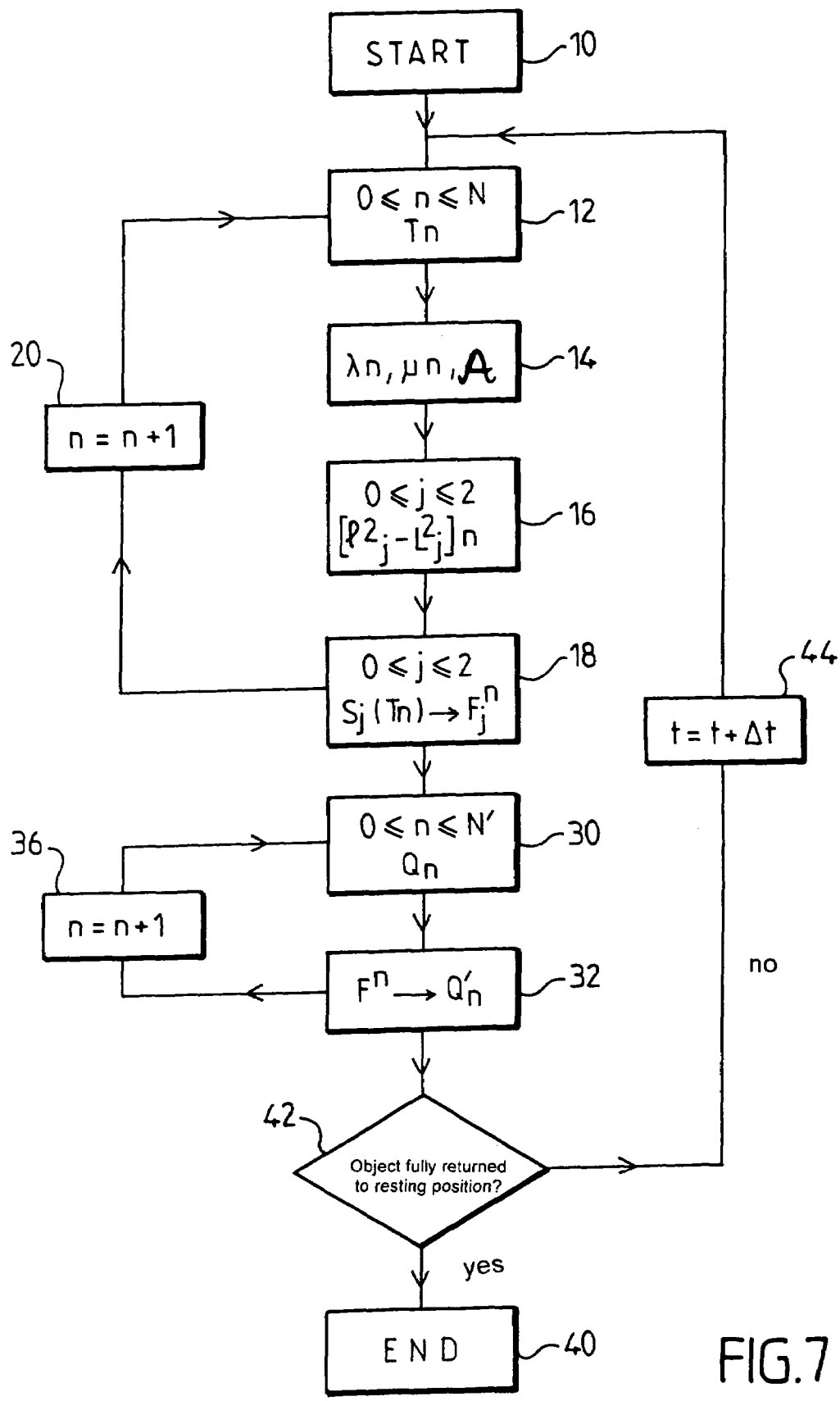
FIG. 7 shows a diagrammatic flow chart of the progress of the calculations of forces and positions of the vertices representing the object.

Reference will now be made to FIG. 7, wherein a flow chart diagrammatically shows the different treatment steps applied to a triangulated three-dimensional surface, by way of example.

The treatment begins with a first step 10, in which the structure of the data described above is applied, with a suitable attribution of indices. Then in step 12 consideration is given to each triangle $T_n$, for which the Lamé coefficients $\lambda_n$ and $\mu_n$ are sought, as well as the area of the triangle A (step 14). For each side of the triangle (j being an integer from 0 to 2), the difference between the squares of the lengths of the sides is calculated, between the current length $l_j$ and the previous length $L_j$ of the side (step 16). From these differences in the lengths of the sides squared, the forces exerted at each vertex $S_j$ of the triangle $T_n$ are deduced (force $F_j^n$ calculated in step 18 of the flow chart). Moving on to the next triangles, the forces are integrated over all the triangles by looping on the index n (step 20).

In steps 30 and 32, the new positions $Q'_n$ of the vertices $S_j$ of the deformed triangles are determined, from their previous position $Q_n$ and the forces $F^n$. By looping on to the index n in step 36, integration is carried out over all the deformed objects. The new positions of the vertices $S_j$ are preferably estimated by using the equations E1, E2 and E3 mentioned hereinbefore.

In the flow chart in FIG. 7, the two respective integrations (of the forces $F_j^n$ and of the positions of the vertices $S_j$ in the deformed objects) are shown separately. Of course, it may be that some of the steps 12 to 20 may be carried out at the same time as or after some of the steps 30 to 36. This choice depends on the structure of the two modules described hereinbefore, contained in the abovementioned computer, and, if applicable, on the data structure.

A test 42 is preferably provided to find out whether the object has fully returned to its resting position, i.e.: is there an edge in the object the length of which differs substantially from the previous one?

If the computer does not find such an edge as it travels over the triangles, the object has returned to its initial resting shape and the treatment is stopped at 40.

Otherwise, an image of the object is displayed by the monitor VISU mentioned above and a time loop (step 44) is incremented, to pass to the next time and show a progressive return to a resting shape of the object, using equation E3, if appropriate. This time loop can be initiated after the first starting step 10.

Of course, the invention is not limited to the embodiment described previously by way of example, but also extends to other alternative embodiments defined within the scope of the claims that follow.

Thus, it will be understood that the invention is not limited to an application to simulating the deformation of soft body tissues. As described previously, the shift in position of a rigid object (for example a bone attached to a muscle) integral with the soft tissue can also be simulated.

In some cases it may be appropriate to use a tensor (of inherently known expression) rather than a deformation tensor of the type described above.

The formula for the deformation energy W, in both a triangular and a tetrahedral grid, is provided hereinbefore by way of example and depends on the material of which the object whose deformation is being simulated consists. However, it is generally expressed by a combination of the traces of the tensor E and the tensor $E^2$. In these particular cases, only the trace of the tensor E (or the tensor $E^2$) may be used.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

ANNEX

F1: $C = \nabla \Phi^t \nabla \Phi$.

F2: $\Phi(X) = \sum_{j=0}^{2} \Lambda_j(X) Q_j \Longrightarrow \nabla \Phi = \sum_{j=0}^{2} \alpha_j \otimes Q_j$ where $\alpha_j = \frac{l_j}{2A} n_j$.

F3: $C = \sum_{j,k} (Q_j \cdot Q_j)(\alpha_j \otimes \alpha_k)$.

F4: $C = \sum_j r^2 (\alpha_j \otimes \alpha_k) + \sum_{\substack{j,k \\ j \neq k}} \left( r^2 - \frac{L_p^2}{2} \right)(\alpha_j \otimes \alpha_k)$ $= r^2 \sum_{j,k} (\alpha_j \otimes \alpha_k) - \frac{1}{2} \sum_{\substack{j,k \\ j \neq k}} L_p^2 (\alpha_j \otimes \alpha_k)$ $= -\frac{1}{2} \sum_{\substack{j,k \\ j \neq k}} L_p^2 (\alpha_j \otimes \alpha_k)$ F5: $W = \frac{\lambda}{2} (tr\ E)^2 + \mu tr\ E^2$ $tr\ E = \frac{1}{2} \boxed{tr\ C} - 1$ $tr\ E^2 = \frac{1}{4} \boxed{tr\ C^2} - tr\ E - \frac{1}{2}$ F6: $tr\ C = -\frac{1}{2} \sum_{\substack{j,k \\ j \neq k}} L_p^2 (\alpha_j \cdot \alpha_k)$.

F7: $\overrightarrow{P_p P_q} \cdot \overrightarrow{P_p P_r} = \begin{cases} l_j l_k \cos(\theta_p) = \frac{1}{2}(l_j^2 + l_k^2 - l_p^2) = K_p & \text{if } q \neq r,\ j = comp(p,q) \\ & \text{and } k = comp(p,r) \\ l_j^2 & \text{if } q = r,\ j = comp(p,q) \end{cases}$ -continued $$R1: \quad (\alpha_j \cdot \alpha_k) = \begin{cases} -\dfrac{l_j l_k}{4A^2}\cos(\theta_p) = -\dfrac{1}{4A^2}K_p & \text{if } j \neq k \text{ and } p = comp(j,k), \\ \dfrac{l_j^2}{4A^2} & \text{if } j = k \end{cases}$$

$$F8: \quad tr\, C = \dfrac{1}{4A^2}\sum_p L_p^2 K_p.$$

$$F9: \quad \boxed{tr\, E = \dfrac{1}{8A^2}\sum_p (L_p^2 - l_p^2)\, K_p = \dfrac{1}{8A^2}[(L_0^2 - l_0^2)K_0 + (L_1^2 - l_1^2)K_1 + (L_2^2 - l_2^2)K_2]}$$

$$F10: \quad tr\, C^2 = \dfrac{1}{4}\sum_{\substack{j,k \\ j\neq k}}\sum_{\substack{m,n \\ m\neq n}} L_p^2 L_q^2 (\alpha_j \cdot \alpha_n)(\alpha_k \cdot \alpha_m)$$

$$F11: F_0^T = \dfrac{\partial W}{\partial Q_0}$$
$$= \dfrac{1}{32A^4}\Big[(\lambda+\mu)\big(\sum_p (L_p^2 - l_p^2)K_p\big)\big(\overrightarrow{Q_2Q_0}K_1 + \overrightarrow{Q_1Q_0}K_2\big) +$$
$$\mu\big((L_1^2 - l_1^2)l_0^2(l_2^2\overrightarrow{Q_2Q_0} - K_0\overrightarrow{Q_1Q_0}) + (L_2^2 - l_2^2)l_0^2(l_1^2\overrightarrow{Q_1Q_0} - K_0\overrightarrow{Q_2Q_0}) -$$
$$(L_0^2 - l_0^2)(l_1^2K_1\overrightarrow{Q_1Q_0} + l_2^2K_2\overrightarrow{Q_2Q_0})\big)\Big]$$

$$F12: \quad \nabla\Phi = \sum_{j=0}^{3}\alpha_j \otimes Q_j \qquad \alpha_j = \dfrac{A_j}{3V}n_j$$

$$F13: \quad C = \sum_{j,k}(Q_j \cdot Q_k)(\alpha_j \otimes \alpha_k)$$

$$F14: \quad (Q_j \cdot Q_k) = \begin{cases} r^2 - \dfrac{L_{jk}^2}{2} & \text{if } j\neq k \\ r^2 & \text{if } j=k \end{cases} \implies \boxed{C = -\dfrac{1}{2}\sum_{\substack{j,k\\j\neq k}}L_p^2(\alpha_j \otimes \alpha_k)}$$

$$F15: \quad W = \dfrac{\lambda}{2}(tr\, E)^2 + \mu\, tr\, E^2$$
$$tr\, E = \dfrac{1}{2}\boxed{tr\, C} - \dfrac{3}{2}$$
$$tr\, E^2 = \dfrac{1}{4}\boxed{tr\, C^2} - tr\, E - \dfrac{3}{4}$$

$$F16: \quad (\alpha_j \cdot \alpha_k) = \begin{cases} -\dfrac{1}{9V^2}K_{jk} & \text{if } j\neq k \\ \dfrac{1}{9V^2}A_j^2 & \text{if } j=k \end{cases}$$

$$\text{with } K_{jk} = \dfrac{(2l_{ln}^2(l_{jl}^2 + l_{kl}^2 - l_{jk}^2) - (l_{jl}^2 + l_{ln}^2 - l_{jm}^2)(l_{kl}^2 + l_{ln}^2 - l_{km}^2))}{(16)}$$

$$F17: \quad tr\, C = \dfrac{1}{9V^2}\sum_{\text{Edges }(j,k)} L_{jk}^2 K_{jk}$$

-continued $$F18: \quad tr\, C^2 = \frac{1}{81\,V^4}\left[\frac{1}{2}\sum_{\text{edges}(j,k)} L_{jk}^4(K_{jk}^2 + A_j^2 A_k^2) + \right.\quad \text{6 terms}$$
$$\sum_{\substack{\text{pairs of edges}\\((j,k),(j,m))}} L_{jk}^2 L_{jm}^2 (K_{jk} K_{jm} - A_j^2 K_{km}) + \quad \text{12 terms}$$
$$\left.\sum_{\substack{\text{pairs of edges}\\((j,k),(m,n))}} L_{jk}^2 L_{mn}^2 (K_{jn} K_{km} + K_{jm} K_{kn})\right]\quad \text{3 terms}$$

$$F19: \quad \boxed{W = \frac{1}{324\,V^4}\left\{\left(\frac{\lambda+\mu}{2}\right)\left[\sum_{\text{Edges}(j,k)}(L_{jk}^2 - l_{jk}^2)K_{jk}\right]^2 + \mu\overline{\Delta}\right\}}$$

$$F20: \quad \overline{\Delta} = \frac{1}{2}\sum_{\text{edges}(j,k)}(L_{jk}^2 - l_{jk}^2)^2 A_j^2 A_k^2 -$$
$$\sum_{\substack{\text{pairs of edges}\\((j,k),(j,m))}}(L_{jk}^2 - l_{jk}^2)(L_{jm}^2 - l_{jm}^2)A_j^2 K_{km} +$$
$$\sum_{\substack{\text{pairs of edges}\\((j,k),(m,n))}}(L_{jk}^2 - l_{jk}^2)(L_{mn}^2 - l_{mn}^2)(K_{jn}K_{km} + K_{jm}K_{kn} - K_{jk}K_{mn})$$

$$F21: \quad F_p = \frac{1}{162\,V^4}\left\{(\lambda+\mu)\left[\sum_{\text{Edges}(j,k)}(L_{jk}^2 - l_{jk}^2)K_{jk}\right]\left[\sum_{\text{Edges}(j,p)}\overrightarrow{Q_jQ_p}K_{jp}\right] + \right.$$
$$\mu\left[\sum_{\text{Edges}(j,p)}(L_{jp}^2 - l_{jp}^2)A_p^2(\overrightarrow{Q_jQ_p}A_j^2 - \overrightarrow{Q_kQ_p}K_{jk} - \overrightarrow{Q_mQ_p}K_{jm}) + \right.$$
$$\left.\left.\sum_{\substack{\text{Edges}(j,k)\\j,k\ne p}}(L_{jk}^2 - l_{jk}^2)(\overrightarrow{Q_mQ_p}K_{jkmp} - \overrightarrow{Q_jQ_p}A_j^2 K_{kp} - \overrightarrow{Q_kQ_p}A_k^2 K_{jp})\right]\right\}$$

$$R2: \quad W = \frac{1}{128A^2}\left[(\lambda+\mu)\left(\sum_p (L_p^2 - l_p^2)K_p\right)^2 + \right.$$
$$\left.\mu\left(\sum_p (L_p^2 - l_p^2)^2 l_j^2 l_k^2 - 2\sum_{\substack{j,k\\j\ne k}}(L_j^2 - l_j^2)(L_k^2 - l_k^2)l_p^2 K_p\right)\right]$$
$$p = comp(j,k)$$

$$E1: \quad m_i \frac{d^2 P_i}{dt^2} = \gamma_i \frac{dP_i}{dt} + F_i$$

$$E2: \quad M\ddot{U} + C\dot{U} + KU = R$$

$$E3: \quad \left(\frac{m_i}{\Delta t^2} - \frac{\gamma_i}{2\Delta t}\right)P_i^{t+1} = F_i + \frac{2m_i}{\Delta t^2}P_i^t - \left(\frac{m_i}{\Delta t^2} + \frac{\gamma_i}{2\Delta t}\right)P_i^{t-1}$$

The invention claimed is:

1. An apparatus for simulating a deformation of soft body tissues, comprising:
   a memory configured to store, for at least one object having a three-dimensional shape:
   mechanical parameters of the material of the object,
   data as to a position of the object recorded at a vertice of at least one selected mesh, and
   force data which represent, in intensity and position, stress to be exerted on the object,
   and a computer operatively connected to the memory to evaluate new positions of the vertices, as a function of the stress exerted and the mechanical parameters of the material,
   wherein the computer comprises:
   a first module (12, 14, 16, 18, 20) configured to determine repeatedly, for each mesh, a deviation between a current length of an edge of the mesh and its previous length and/or its length at rest, and to store respective force data relating to a potential energy of deformation for each vertex of the mesh, the respective force data being obtained from said deviation, and a second module (30, 32, 36) configured to determine repeatedly, for each vertex, new data as to the position of the vertex as a function of composition of forces exerted thereon, data relating to at least one previous position of the vertex and mechanical parameters of the material.

2. An apparatus according to claim 1, wherein for an object in the form of a hollow three-dimensional envelope a grid pattern chosen is triangular, and wherein the computer is configured to determine the composition of forces at each vertex of a triangle, as a function of the deviation between the current length of each side of the triangle and the length of the side at rest.

3. An apparatus according to claim 1, wherein for an object of solid three-dimensional shape, the grid pattern chosen is tetrahedral, wherein the computer is configured to estimate the composition of the forces at each vertex of the tetrahedron, as a function of the deviation between the current length of each edge of the tetrahedron and the length of this edge at rest.

4. An apparatus according to claim 1, wherein the computer is configured to determine differences between squares of the current length and the previous length and/or the length at rest of each edge in order to determine said composition of forces.

5. An apparatus according to claim 1, wherein the memory is configured to store, in association with each mesh, mechanical parameters of the material of the mesh, at least partially defined locally, particularly at a level of the mesh or elements thereof.

6. An apparatus according to claim 5, wherein the computer is configured to determine said deviation between the current and at rest lengths, in order to estimate a derivative of the potential deformation energy of each mesh with respect to the position of each vertex of the mesh, the potential deformation energy being expressed as a function of a Green-St Venant tensor and of mechanical coefficients inherent in the material in said mesh, which provides said force data for the vertex of the mesh.

7. An apparatus according to claim 6, wherein the mechanical parameters comprise Lamé coefficients of the material in each mesh in question.

8. An apparatus according to claim 1, further comprising a third module for developing a data structure and configured to delete mesh sides or edges which connect two "virtual" vertices.

9. An apparatus according to claim 8, wherein the third module for developing the data structure is further configured to verify that a grid pattern satisfies predefined properties of conformity.

10. An apparatus according to claim 1, wherein the second module configured to determine new positional data of the vertices as a function of the composition of forces at each vertex, is configured to determine said new positional data as a function of time, which makes it possible to follow an evolution of the respective positions of the vertices over time.

11. An apparatus according to claim 10, wherein the determination of the new positional data of the vertices uses a model for solving a differential equation applied to each vertex.

12. An apparatus according to claim 2, wherein the computer is capable of repeatedly determining the positional data of the vertices of the grid, in order to determine an evolution of said positions over time.

13. An apparatus according to claim 12, further comprising a display interface capable of representing the object in a predetermined form and shown with the chosen grid pattern, and wherein the display interface is operatively connected to the computer in order to display the shape of a moving object.

14. An apparatus according to claim 1, further comprising a user interface provided with a handling device for simulating one or more forces exerted globally on the object.

* * * * *